US008810599B1

(12) United States Patent
Tseng

(10) Patent No.: US 8,810,599 B1
(45) Date of Patent: Aug. 19, 2014

(54) IMAGE RECOGNITION IN AN AUGMENTED REALITY APPLICATION

(75) Inventor: Erick Tseng, San Francisco, CA (US)

(73) Assignee: Google Inc., Mountain View, CA (US)

( * ) Notice: Subject to any disclaimer, the term of this patent is extended or adjusted under 35 U.S.C. 154(b) by 297 days.

(21) Appl. No.: 13/249,826

(22) Filed: Sep. 30, 2011

Related U.S. Application Data

(63) Continuation of application No. 12/938,132, filed on Nov. 2, 2010.

(51) Int. Cl.
| | | |
|---|---|---|
| *G09G 5/00* | (2006.01) | |
| *G06K 9/00* | (2006.01) | |
| *G06K 9/46* | (2006.01) | |
| *G08B 5/22* | (2006.01) | |
| *G08B 25/00* | (2006.01) | |
| *B60Q 1/00* | (2006.01) | |
| *G08B 1/08* | (2006.01) | |
| *G08G 1/123* | (2006.01) | |
| *G01V 3/38* | (2006.01) | |
| *G01C 17/38* | (2006.01) | |
| *G01C 17/00* | (2006.01) | |
| *G05D 1/02* | (2006.01) | |
| *G06F 17/30* | (2006.01) | |
| *G06T 7/00* | (2006.01) | |

(52) U.S. Cl.
CPC ............ *G06T 7/0018* (2013.01); *G05D 1/0278* (2013.01); *G05D 1/027* (2013.01); *G06F 17/3087* (2013.01); *G05D 1/0246* (2013.01); *G06F 17/30247* (2013.01); *G05D 1/0274* (2013.01); *G06F 17/30241* (2013.01)
USPC ........... 345/633; 345/581; 382/106; 382/190; 340/435; 340/988; 340/539.13; 340/8.1; 702/150; 702/5; 702/94; 702/85

(58) Field of Classification Search
CPC ..................... G02B 27/017; G02B 2027/0178; G02B 2027/014; G02B 27/01; G06F 17/30241; G06F 17/3087; G06F 17/30041; G06F 17/30047; G06F 17/30247; G06T 19/006; G06T 7/004; G06T 7/0018; G05D 1/0278; G05D 1/0246; G05D 1/0274; G05D 1/027; H04N 2201/3253
USPC ........ 345/8, 158, 633, 581; 382/106, 154, 19; 340/435, 988, 539.13, 8.1; 701/300; 702/150, 5, 94, 85
See application file for complete search history.

(56) References Cited

U.S. PATENT DOCUMENTS

| | | |
|---|---|---|
| 4,645,459 A | 2/1987 | Graf et al. |
| 5,850,352 A | 12/1998 | Moezzi et al. |

(Continued)

OTHER PUBLICATIONS

Author: RoboGeo, Title: Geocode Digital Photos, Date: Jan. 13, 2006, pp. 36, http://web.archive.org?web?20051125023223/http://www.robogeo.com/home.

(Continued)

*Primary Examiner* — Jeffrey Chow
(74) *Attorney, Agent, or Firm* — Fish & Richardson P.C.

(57) ABSTRACT

A computer-implemented augmented reality method includes obtaining an image acquired by a computing device running an augmented reality application, identifying image characterizing data in the obtained image, the data identifying characteristic points in the image, comparing the image characterizing data with image characterizing data for a plurality of geo-coded images stored by a computer server system, identifying locations of items in the obtained image using the comparison, and providing, for display on the computing device at the identified locations, data for textual or graphical annotations that correspond to each of the items in the obtained image, and formatted to be displayed with the obtained image or a subsequently acquired image.

27 Claims, 7 Drawing Sheets

(56) References Cited

U.S. PATENT DOCUMENTS

| | | | |
|---|---|---|---|
| 6,222,937 | B1 | 4/2001 | Cohen et al. |
| 6,266,068 | B1 | 7/2001 | Kang et al. |
| 6,278,461 | B1 | 8/2001 | Ellenby et al. |
| 6,535,210 | B1 | 3/2003 | Ellenby et al. |
| 6,570,566 | B1 | 5/2003 | Yoshigahara |
| 6,690,370 | B2 | 2/2004 | Ellenby et al. |
| 6,883,146 | B2 | 4/2005 | Prabhu et al. |
| 7,493,153 | B2 | 2/2009 | Ahmed et al. |
| 2003/0114972 | A1* | 6/2003 | Takafuji et al. ............... 701/45 |
| 2005/0116964 | A1* | 6/2005 | Kotake et al. ............... 345/629 |
| 2007/0258642 | A1 | 11/2007 | Thota |
| 2008/0240616 | A1* | 10/2008 | Haering et al. ............... 382/294 |
| 2009/0289955 | A1* | 11/2009 | Douris et al. ............... 345/630 |
| 2010/0141795 | A1* | 6/2010 | Kim et al. ............... 348/231.3 |
| 2011/0199479 | A1* | 8/2011 | Waldman ............... 348/116 |
| 2011/0214082 | A1 | 9/2011 | Osterhout et al. |
| 2011/0275408 | A1* | 11/2011 | Kulik ............... 455/556.1 |
| 2011/0280447 | A1* | 11/2011 | Conwell ............... 382/103 |
| 2012/0062445 | A1 | 3/2012 | Haddick et al. |

OTHER PUBLICATIONS

Author: Flickrmap, Title: Geotagging Flickr photos with Google Earth, Date: Apr. 4, 2006, pp. 2 source: http://web.archive.org/web/20060404213639/www.flickrmap.com/tutorials/google_earth.php.

Author: Michael Arrington, Title: Flickr Geo Tagging Now Live, Date: Aug. 28, 2006, pp. 1, source: http://www.techcrunch.com/2006/08/28 flickr-to-launch-geo-tagging-today/.

Author: Rakaz, Title: Geotagging with Picasa and Google Earth, Date: Aug. 23, 2006, pp. 6, source: http://rakaz.nl/2006/08/geotagging-with-picasa-and-google-earth.html.

Author: Sue Chastain, Title: What's New in Photoshop Elements 5—Map View, Date: Feb. 13, 2007, pp. 2, source: http://web.archive.org/web/20070213213516/http://graphicssoft.about.com/od/pselements/ig/PSE5new/Map-View.htm.

Author: Stewart Butterfiel, Title: Great shot—where'd you take that?, Date: Aug. 28, 2006, pp. 4, source: http://blog.flickr.neUen/2006/08/28/great-shot-whered-you-take-that/.

Author: Joe Hughes, Title: The I ncrementalist, Date: Jun. 17, 2006, pp. 10, source: http://retrovirus.com/incr/2006/06/picasa-geotagging/.

Author: Stefan Geens, Title: Picasa + Google Earth = bliss, Date: Jun. 15, 2006, pp. 5 source: http://www.ogleearth.com/2006/06/picasa_google_e.html.

Author: Frank Taylor, Title: Picasa Web Album—Geotag Photos Using Google Earth!, Date: Jun. 14, 2006, pp. 5 source: http://www.gearthblog.com/blog/archives/2006/06/picasa_web_albu.html.

Author: Flickr, Title: Geotags & You, Date: Dec. 21, 2006, pp. 21, source: http://web.archive.org/web/20061221185831 /http://www.flickr.com/help/screencasts/vol1.

Author: Philipp Lenssen, Title: Google Picasa Web Albums Live, Date: Jun. 14, 2006, pp. 5, source: http://blogoscoped.com/archive/2006-06-14-n55.html.

Office Action for U.S. Appl. No. 11/762,670 dated Feb. 18, 2010. 24 pages.

Office Action for U.S. Appl. No. 11/762,670 dated Aug. 4, 2010. 17 pages.

Notice of Allowance and Fee Due for U.S. Appl. No. 11/762,670 dated Mar. 3, 2011. 6 pages.

Office Action for U.S. Appl. No. 12/938,132 dated Jan. 12, 2012. 18 pages.

Final Office Action for U.S. Appl. No. 12/938,132 dated May 22, 2012, 20 pages.

Office Action for U.S. Appl. No. 12/938,132 dated Dec. 13, 2013, 14 pages.

* cited by examiner

IMAGE RECOGNITION IN AN AUGMENTED REALITY APPLICATION

CROSS-REFERENCE TO RELATED APPLICATIONS

This application is a continuation of U.S. patent application Ser. No. 12/938,132, filed Nov. 2, 2010, which is incorporated herein in its entirety.

TECHNICAL FIELD

This document relates to augmented reality applications.

BACKGROUND

Augmented reality applications allow a user to see a presentation of the world augmented with or superimposed by computer-generated imagery. The imagery may be graphical or textual. The presented world may be presented directly to the user, such as when the user is looking through a display, and the imagery is applied to or projected on the display. The world may also be presented indirectly, such as when a user is navigating previously captured images of the real world, rather than the world that is presently in front of the user.

Augmented reality is now being implemented on mobile computing devices that include digital cameras. In such implementations, the view that is currently being captured by the camera can be displayed as a scene on a screen of the mobile device, and data about items that are shown in the scene may have textual annotations added to them. Non-visible objects may also be represented by annotations. Thus, for example, a user in a city may hold their smart phone in front of them and may be shown the names of restaurants around them. The information may change as a user spins, so that only restaurants that are in front of the user/device are shown. However, it can be difficult to determine precisely where the user is aiming their device, because the camera may simultaneously show multiple items, such as buildings, particularly when the items are at different distances from the user and thus overlap within the device's field of view.

SUMMARY

The manner in which the annotations are displayed may also be arranged to assist the user in navigating the augmented reality. For example, certain items in the image may be determined to be more popular than other items, and thus may be displayed more prominently to a user. For example, if users of a search engine enter the query "coffee shop" much more often than they enter the term "tobacco shop," then an annotation over a coffee shop in a particular user's augmented reality may be preferred over an annotation for a tobacco shop. Such preference may be shown, for example, by providing a larger user-selectable icon over the coffee shop or over a building that houses the coffee shop, or otherwise annotating it more prominently. Similar preferences may be directed to preferences of a particular user, e.g., if the user searches often for coffee shops while traveling.

In addition, the determinations made by such image comparisons may be used to calibrate position determining mechanisms for a device or for a system. In particular, a location and inclination of a device may be determined by the process, and may be compared to any location and inclination readings taken by the device, so that the device may be recalibrated to match reality. Likewise, a cell ID or other access point location system may be inherently imprecise, but locations of access points in such a system may be refined by comparing current measurements about user location by the system against measurements of the device using images taken from that location.

In one implementation, a computer-implemented augmented reality method is disclosed. The method comprises obtaining an image acquired by a computing device running an augmented reality application, identifying image characterizing data in the obtained image, the data identifying characteristic points in the image, comparing the image characterizing data with image characterizing data for a plurality of geo-coded images stored by a computer server system, identifying locations of items in the obtained image using the comparison, and providing, for display on the computing device at the identified locations, data for textual or graphical annotations that correspond to each of the items in the obtained image, and formatted to be displayed with the obtained image or a subsequently acquired image. The method can also comprise identifying data that is indicative of interactions by a user of the computing device with the textual or graphical annotations displayed on the computing device, and stored the data with the acquired image for comparison to future images that are acquired, and with the plurality of geo-coded images. Moreover, the method can include determining a location of the computing device by computing an offset between a location at which one of the geo-code images was taken and a location at which the obtained image was taken.

In some aspects, the method also comprises determining a direction of aim of the computing device by computing an offset between a location at which one of the geo-code images was taken and a location at which the obtained image was taken. The method can also include calibrating a compass module on the computing device using the determined direction of aim and a direction of aim sensed by the compass module when the obtained image was taken. In addition, the image characterizing data can comprise corner points on items in the images, and identifying locations of items in the obtained image can comprise computing outlines of the items in the obtained image. The method can further comprise identifying locations within the identified outlines as anchor points for the annotations so that the annotations are display on the items on the mobile device, and can also comprise using range data obtained by the computing device that indicates a distance of one or more items in the image from the computing device, and using the range data to identify locations of items in the obtained image. The method can also comprise selecting the plurality of geo-coded images from a larger group of geo-coded images using information received from the mobile computing device that identifies a current location of the mobile computing device, and the selecting of the plurality of geo-coded images can comprise selecting a sub-set of images that are coded as being acquired within a determined geographic distance from the current location of the mobile computing device.

In another implementation, a tangible non-transient recordable computer storage media is discussed. The media stores instructions that when executed cause the performance of actions that comprise acquiring one or more digital images with a computing device running an augmented reality application; obtaining, with the computing device, data for textual or graphical annotations that correspond to items in the one or more acquire images by (a) generating image characterizing data in the obtained image, the data identifying characteristic points in the image, (b) comparing the image characterizing data with image characterizing data for a plurality of geo-coded images stored by a computer server system, and (c) identifying locations of items in the obtained image using the comparison; and displaying on the computing device at the identified locations, data for the textual or graphical annotations that correspond to items in the obtained image, and formatted to be displayed with the obtained one or more images or subsequently acquired one or more images. The actions can further comprise identifying data that is indicative of interactions by a user of the computing device with the textual or graphical annotations displayed on the computing device, and storing the data with the acquired image for comparison to future images that are acquired, and with the plurality of geo-coded images.

In some aspects, the actions further comprise calibrating a compass module on the computing device using (a) a direction of aim determined by computing an offset between a location at which one of the geo-code images was taken and a location at which the obtained image was taken, and (b) a direction of aim sensed by the compass module when the obtained image was taken. Also, identifying locations of items in the obtained image comprises computing outlines of the items in the obtained image.

In yet another implementation, a computer-implemented augmented reality system is disclosed. The system comprises a computing device that includes one or more cameras for capturing images of items in front of the computing device; one or more wireless interfaces for transmitting the captured images to a image analysis server system that is remote from the computing device; and an augmented reality application on the computing device programmed to display one or more textual or icon annotations overlaid on the captured images, the annotations generated by comparing data generated from the captured images to data generated from geo-coded images that are stored by the image analysis server system, and wherein the icons are positioned to lay on top of items in the images whose locations are identified in the images by comparing the data on the image analysis server system.

The augmented reality application can be further programmed to identifying data that is indicative of interactions by a user of the mobile computing device with the textual or graphical annotations displayed on the mobile computing device, and provide the data to the image analysis server system for comparison with future images submitted to the image analysis server system by other computing devices. Data generated form the captured images can comprise image characterizing data that includes corner points on items in the images, and the annotations can be aligned with items in the captured images that the annotations describe. Also, the augmented reality application can be further programmed to use alignment data received from the image analysis server system to position the annotations on the device, and the image analysis server system can be programmed to select the stored geo-coded images from a larger group of geo-coded images using information received from the computing device that identifies a current location of the computing device. In other aspects, the image analysis server is further programmed to select the plurality of geo-coded images by selecting a sub-set of images that are coded as being acquired within a determined geographic distance from a current location of the computing device reported by the computing device.

In another implementation, a system includes a computing device that includes one or more cameras for capturing images of items in front of the computing device; one or more wireless interfaces for transmitting the captured images to a image analysis server system that is remote from the computing device; and means on the computing device to communicate with a server system that generates textual or iconic annotations by comparing data generated from the captured images to data generated from geo-coded images that are stored by the server system, and to display the annotations positioned to lay on top of items in the captured images whose locations are identified in the images by comparing the data on the server system.

The details of one or more implementations are set forth in the accompanying drawings and the description below. Other features and advantages will be apparent from the description and drawings, and from the claims.

DETAILED DESCRIPTION

Figure 1:
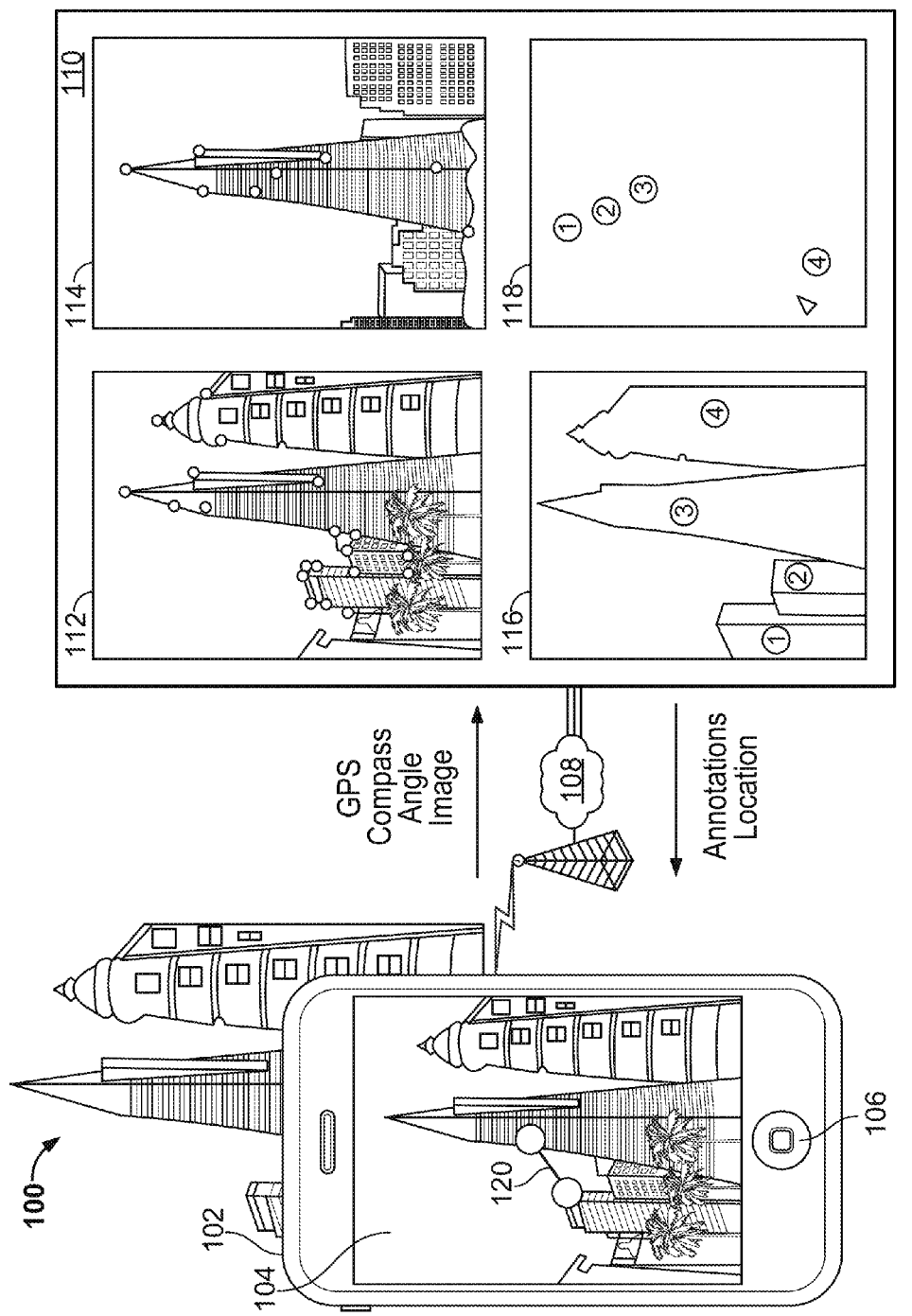
FIG. 1 is a conceptual diagram showing determination of location in an augmented reality system.

Referring to FIG. 1, in accordance with some implementations, a system 100 includes a mobile device 102. In general, the device 102 may be provided with a display and applications for showing items that are in front of the device 102 and captured by a camera on the device, along with superimposed annotations that described items in the field of view of the device 102. The device 102 may send information about its operation, such as its location, direction of aim, and angle of inclination, to a remote server 100 (which may include a single server or a multitude of servers that each perform particular functions in a larger server system), which may in turn compare such information and the image the device 102 has captured to other images captured by other users. Such comparisons may be used to improve the information that is presented to a user of the device 102.

In the example shown, the mobile device 102 is a cellular phone. In other implementations, the mobile device 102 can be a personal digital assistant, a laptop computer, a net book, a camera, a wrist watch, or another type of mobile electronic device. The mobile device 102 includes a camera (not shown) for capturing images, a display screen 104 for displaying graphics, texts, and images, and one or more input keys 106 for receiving user input. In the example depicted in FIG. 1, the display screen 104 is a touch screen capable of receiving user input. For example, a user contacts the display screen 104 using a finger or stylus in order to select items displayed by the display screen 104, enter text, or control functions of the mobile device 102. The one or more input keys 106 can be used to make selections, enter text, return to a home screen, or control functions of the mobile device 102.

The mobile device 102 includes functionality for determining positional information. For example, the mobile device 102 includes GPS functionality for determining a geographic location of the mobile device 102, a compass for determining a viewing direction of the camera, and an accelerometer for determining a vertical viewing angle of the camera. This information can be used to determine locations that are within the viewing range of the camera. In the example shown, the camera of the mobile device 102 captures images of a streetscape which are displayed on the display screen 104 in real-time or near real-time. The streetscape includes several buildings having distinctive features, including the Transamerica Pyramid. The mobile device 102 transmits an image of the streetscape and current positional information (e.g. location, viewing direction, and vertical angle) to a server 110 through a network 108. The server 110 receives and stores the image 112 captured by the mobile device 102.

The server 110 analyzes the image 112 to identify characteristic points of objects depicted in the image 112. In this example, the server 110 detects characteristic points of the buildings pictured in the image 112. The characteristic points can depict the edge points or corners of the building structures in the image 112. For example, characteristic point detection software of the server 110 can detect corners by identifying points for which there are two dominant and different edge directions in a local area of points surrounding the identified corner point. Other characteristic points in the image besides corner points can also be identified. Other identified characteristic points can include isolated points of local intensity maximum or minimum within the image, line endings, or points on curves where the curvature is locally maximal. In some implementations, the server 110 may use a self-similarity based algorithm for detecting characteristic points and edges within the image 112. For example, the algorithm may analyze each pixel within the image 112 to determine if a characteristic point is present by detecting the similarities between a patch of pixels centered on the pixel being analyzed and nearby, partially overlapping patches of pixels. If the pixel is in a region of uniform intensity, then the nearby patches will be similar. If the pixel is on an edge, then nearby patches in a direction perpendicular to the edge will appear quite different, whereas nearby patches in a direction parallel to the edge will appear similar. The pixel can be identified as a corner characteristic point if the analysis detects pixel variation in all directions.

Still referring to FIG. 1, in accordance with some implementations, the server 110 uses GPS, compass, and vertical angle data received from the mobile device 102 through the network 108 to identify geo-coded images. For example, GPS data received by the server 110 can indicate a current geographic location of the mobile device 102. The server 110 can use the GPS data to identify geo-coded images that are associated with locations within a determined distance of the mobile device 102, such as 10 miles, 1 miles, or several hundred feet. The distance can depend on the sort of area the user is in, in that shorter distances may be appropriate in urban or hilly areas (which can be determined using available terrain data) where the user is not likely to be able to see far. As another example, the server 110 uses GPS data as well as viewing direction and vertical viewing angle information to determine locations that are within the viewing area of the camera of the mobile device 102. The server 110 then identifies geo-coded images that are associated with locations within the viewing area of the camera.

Upon identifying geo-coded images associated with locations that are relevant to the current location of the mobile device 102, the server 110 compares one or more of the identified geo-coded images to the image 112 to determine if there is a match between the image 112 and the identified geo-coded image. In some implementations, the image 112 is compared to one or more geo-coded images that are not actual images of the buildings they depict, but rather images of models or drawings of the buildings. For example, blue prints of a building may be compared to the image 112.

For example, the server 110 receives GPS data indicating that the mobile device 102 is located in downtown San Francisco. In some implementations, the server 110 also receives data indicating a viewing direction and vertical viewing angle of the camera of the mobile device 102. The server 110 identifies a geo-coded image 114 as being associated with a location within the viewing area of the camera. In some implementations, characteristic points of the image 114 have been predetermined. In other implementations, the server 110 analyzes the image 114 to identify characteristic points of objects depicted in the image 114 as described above for the image 112. In some implementations, edges of objects depicted in the image 114 are detected instead of or in addition to characteristic points. The server 110 then compares characteristic points and/or edges identified in the image 114 with characteristic points and/or edges identified in the image 112 in order to determine if objects depicted in the image 114 match objects depicted in the image 112. In some implementations, the server 110 may compare the level of similarity between characteristic points of the images 112 and 114 to a predetermined similarity threshold. If the level of similarity between the characteristic points of the images 112 and 114 is above the predetermined similarity threshold, then one or more objects depicted in the images 112 and 114 are identified as being the same object.

In the example depicted, the server 110 detects characteristic points for various buildings shown in the image 112. In some implementations, the server 110 may identify the various buildings in the image 112 as being individual buildings. The server 110 then compares characteristic points for each of the buildings in image 112 with the characteristic points for the building shown in the center of the image 114. The server 110 concludes that the characteristic points of the building in the center of the image 112 match the characteristic points of the building in the center of the image 114 and determines that the two images depict the same building. In some implementations, the server 110 accesses additional geo-coded data associated with the image 114. For example, additional geo-coded data can indicate that the image is a picture of the Transamerica Pyramid. The server 110 can then identify information about businesses located within the Transamerica Pyramid, and historical information about the Transamerica Pyramid. For example, the image 114 is labeled "Transamerica Pyramid." The server 110 performs an internet search using "Transamerica Pyramid" as a search string. In some implementations, location information can be used to refine the search. For example, a search for "Transamerica Pyramid San Francisco" is performed by the server 110. The top search results can be associated with the image 114 or the image 112.

Information identified as being associated with the Transamerica Pyramid can be used to create annotations that are transmitted by the server 110 to the mobile device 102 through the network 108. The mobile device 102 can then overlay the annotations containing the information over the image of the Transamerica Pyramid displayed on the display screen 104. In some implementations, the server 110 will also send the image 114 and/or other images associated with the Transamerica Pyramid to the mobile device 102. The mobile device can display one or more of the received images as an annotation overlaid on the image of the Transamerica Pyramid captured by the camera of the mobile device 102 and displayed on the display screen 104. In some implementations, a user can select an annotation to cause additional information to appear on the display screen 104. For example, a simple annotation may indicate that the building shown is the Transamerica Pyramid. The user can select the annotation to reveal a list of businesses located within the Transamerica Pyramid. As another example, the user selects an annotation in order to cause directions from the users current location to the Transamerica Pyramid to be displayed. As yet another example, the user selects an annotation to cause a landing page (e.g. a web page) associated with the Transamerica Pyramid or a business located within the Transamerica Pyramid to be displayed.

In some implementations, in addition to comparing characteristic points between images to determine if two images depict the same object, the server 110 can compare characteristic points in order to an offset between the location from which the image 112 was taken and the location from which the image 114 was taken. The differences in position and distance between various characteristic points of the two images 112 and 114 are compared to determine the offset. If the geo-graphic location from which the image 114 was taken in known, this known geo-graphic location, along with the offset calculated between the characteristic points of the images 112 and 114 can be used to calculate a location from which the image 112 was captured. For example, the server 110 may determine, based on differences in distance between the characteristic points of the images 112 and 114, that the image 112 was captured from the same viewing direction as the image 114, but from a greater distance away from the Transamerica Pyramid. The server 110 can use the differences in distance between the characteristic points to calculate a difference in distance between where the image 112 was captured and where the image 114 was captured. This distance can be used in conjunction with a known location from where the image 114 was captured in order to determine a location from which the image 112 was captured.

In some implementations, this calculated location for the image 112 is used to calibrate GPS, compass, or accelerometer functionality of the mobile device 102. For example, there may be a discrepancy between a geographic location for the mobile device 102 determined by a GPS unit of the mobile device 102 and the calculated location determined by the server 110. The calculated location is used to correct the location detection functionality of the GPS unit to help the GPS unit make more accurate location determinations in the future. As another example, there may be a discrepancy between a viewing direction determined by a compass of the mobile device 102 and a viewing direction calculated by the server 110 based on offset measurements between characteristic points of the images 112 and 114. The calculated viewing direction can be used to calibrate the compass so that future direction measurements made by the compass are more accurate. In some implementations, upon determining a location from which the image 112 was captured, the server 110 will store the image 112 as a geo-coded image and use the image 112 in future comparisons with other images.

In some implementations, the image 112 is stored in a database of geo-coded images along with location information provided by the mobile device 102. In other implementations, the image 112 is stored in a database of geo-coded images along with location information calculated based on a location associated with the 114 and offset information from comparisons between characteristic points of the images 112 and 114. In some implementations, the mobile device 102 may be capable of determining a general location of the mobile device 102 but not a specific geographic location. In such implementations, location information that is calculated based on a location associated with the 114 and offset information from comparisons between characteristic points of the images 112 and 114 can be provided to the mobile device 102. The mobile device 102 can then display the location information on the display screen 104 to indicate to a user the current location of the user.

Still referring to FIG. 1, in accordance with some implementations, the server 110 estimates outlines for objects depicted in the 112 to create an outline image 116. In the example depicted, the server 110 has created outlines for four distinct buildings depicted in the image 112. The server 110 identifies the buildings as buildings 1, 2, 3, and 4 respectively within the outline image 116. In some implementations, the outlines shown in the outline image 116 are used to separate the various buildings so that characteristic points for each building can be identified separately, and the characteristic points for each building can be compared to various geo-coded images to identify each of the buildings 1, 2, 3, and 4 individually. In some implementations, the outlines shown in the outline image 116 are used by the server 110 or the mobile device 102 to better position annotations over the buildings within an image displayed on the display screen 104. For example, the server 110 uses the spatial relationships defined by the outline image 116 to ensure that annotations associated with the location of building 1 are positioned on or over building 1 and annotations associated with the location of building 2 are positioned on or over building 2 within the image displayed by the mobile device 102.

In some implementations, the server 110 identifies each of the buildings 1, 2, 3, and 4 by comparing the characteristic points of the image 112 or edges depicted in the outline image 116 to pre-stored, geo-coded images as described above. The server 110 can use the identification of each building to identify geographic locations associated with each building. The server 110 then creates a map 118 which indicates the geographic locations of the buildings 1, 2, 3, and 4. In some implementations, an image match based on characteristic points is made for one or more, but not all of the buildings 1, 2, 3, and 4. In such implementations, location information for the identified buildings, and positional information supplied by the mobile device 102 may be used to determine the identities or locations of the buildings that could not be identified based on characteristic point matching. For example, if the location of building 3 is identified using characteristic point matching, the location of building 4 can be determined based on the spatial relationship of the building 4 to the building 3 within the outline image 116, the known locations of the building 3 and the mobile device 102, and the viewing direction and vertical viewing angle information supplied by the mobile device 102.

As described above, in some implementations, characteristic points for each building are identified, and each building is separately compared to objects in pre-stored geo-coded images, using its characteristic points and the characteristic points of those other objects. In some implementations, one or more objects within the image 112 are compared to other images together. For example, the characteristic points of the building 1 and the building 3 may be compared to characteristic points of a pre-stored, geo-coded image. The comparison can indicate a match between the two images. In some implementations, this joint comparison of two objects within the image 112 is indicated by an annotation 120. In this example, the annotation 120 is shown as points overlaid on the images of the buildings 1 and 3 and a line connecting the two points. In some implementations, a user can select one of the points to cause information about the building associated with the point to be displayed on the display screen 104. In some implementations, the line of the annotation 120 can be selected by the user to cause information associated with both of the buildings 1 and 3 to be displayed. For example, the two buildings may have been created by the same architect. As another example, selecting the line can cause directions from building 1 to building 3 to be displayed on the display screen 104.

Figure 2:
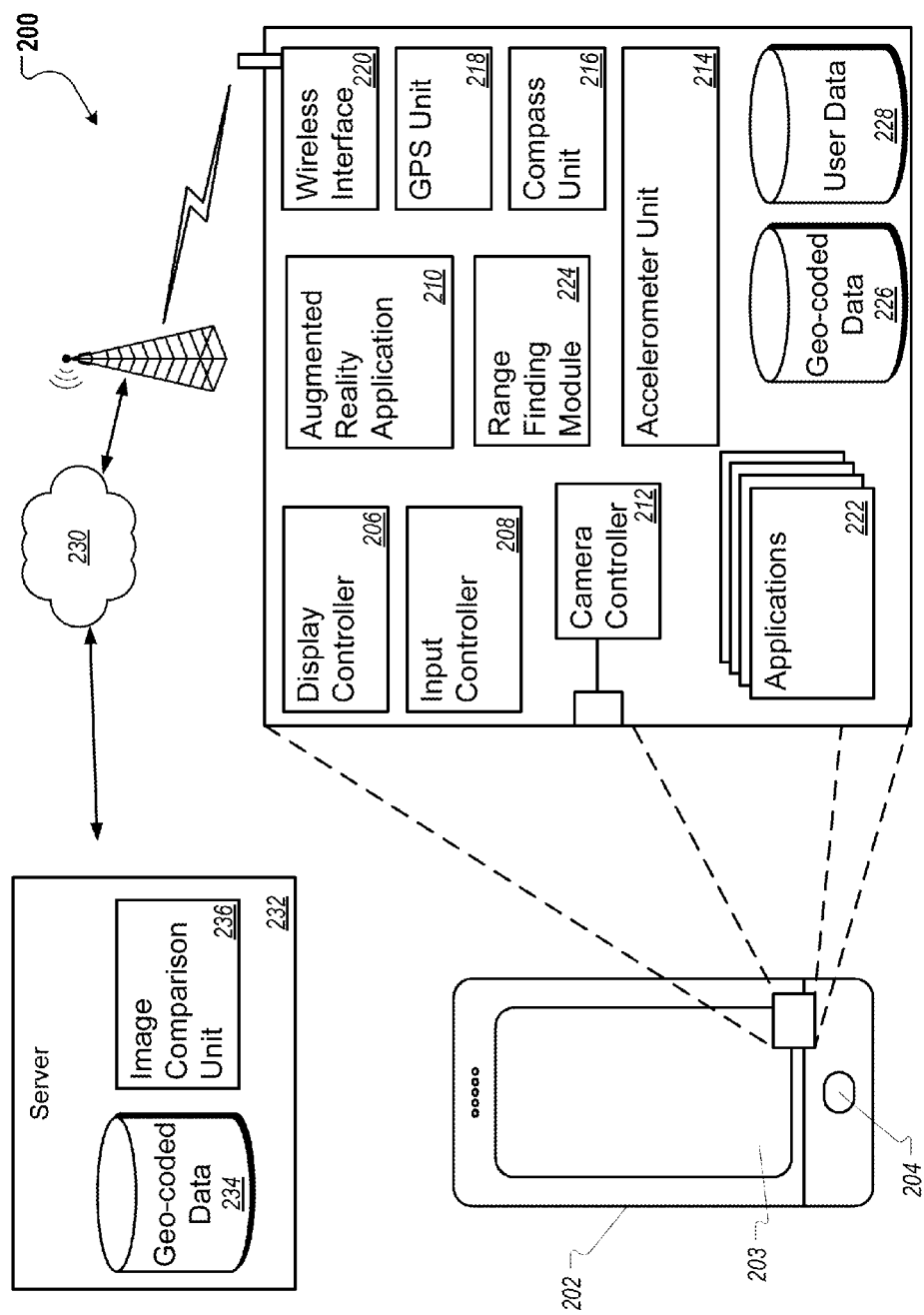
FIG. 2 is a schematic diagram of a system for interacting with a user by way of an augmented reality application on a mobile device.

Referring now to FIG. 2, in accordance with some implementations, a communications system 200 includes a mobile device 202. In the example shown, the mobile device 202 is a cellular phone. In other implementations, the mobile device 202 can be a personal digital assistant, a laptop computer, a net book, a camera, a wrist watch, or another type of mobile electronic device. The mobile device 202 includes a camera (not shown) and a display screen 203 for displaying text, images, and graphics to a user, including images captured by the camera. In some implementations, the display screen 203 is a touch screen for receiving user input. For example, a user contacts the display screen 203 using a finger or stylus in order to select items displayed by the display screen 203, enter text, or control functions of the mobile device 202. The mobile device 202 further includes one or more input keys such as a track ball 204 for receiving user input. For example, the track ball 204 can be used to make selections, return to a home screen, or control functions of the mobile device 202. As another example, the one or more input keys includes a click wheel for scrolling through menus and text.

The mobile device 202 includes a number of modules for controlling functions of the mobile device 202. The modules can be implemented using hardware, software, or a combination of the two. The mobile device 202 includes a display controller 206, which may be responsible for rendering content for presentation on the display screen 203. The display controller 206 may receive graphic-related content from a number of sources and may determine how the content is to be provided to a user. For example, a number of different windows for various applications 222 on the mobile device 202 may need to be displayed, and the display controller 206 may determine which to display, which to hide, and what to display or hide when there is overlap between various graphical objects. The display controller 206 can include various components to provide particular functionality for interacting with displayed components, which may be shared across multiple applications, and may be supplied, for example, by an operating system of the mobile device 202.

An input controller 208 may be responsible for translating commands provided by a user of mobile device 202. For example, such commands may come from a keyboard, from touch screen functionality of the display screen 203, from trackball 204, or from other such sources, including dedicated buttons or soft buttons (e.g., buttons whose functions may change over time, and whose functions may be displayed on areas of the display screen 203 that are adjacent to the particular buttons). The input controller 208 may determine, for example, in what area of the display commands are being received, and thus in what application being shown on the display the commands are intended for. In addition, it may interpret input motions on the touch screen 203 into a common format and pass those interpreted motions (e.g., short press, long press, flicks, and straight-line drags) to the appropriate application. The input controller 208 may also report such inputs to an event manager (not shown) that in turn reports them to the appropriate modules or applications. For example, a user viewing an options menu displayed on the display screen 203 selects one of the options using one of the track ball 204 or touch screen functionality of the mobile device 202. The input controller 208 receives the input and causes the mobile device 202 to perform functions based on the input.

A variety of applications 222 may operate, generally on a common microprocessor, on the mobile device 202. The applications 222 may take a variety of forms, such as mapping applications, e-mail and other messaging applications, image viewing and editing applications, video capture and editing applications, web browser applications, music and video players, and various applications running within a web browser or running extensions of a web browser.

A wireless interface 220 manages communication with a wireless network, which may be a data network that also carries voice communications. The wireless interface 220 may operate in a familiar manner, such as according to the examples discussed below, and may provide for communication by the mobile device 202 with messaging services such as text messaging, e-mail, and telephone voice mail messaging. In addition, the wireless interface 220 may support downloads and uploads of content and computer code over a wireless network.

A camera controller 212 of the mobile device 202 receives image data from the camera and controls functionality of the camera. For example, the camera controller 212 receives image data for one or more images (e.g. stationary pictures or real-time video images) from the camera and provides the image data to the display controller 206. The display controller 206 then displays the one or more images captured by the camera on the display screen 203. As another example, the camera includes physical zoom functionality. In this example, the camera controller 212 receives input from a user via the input controller 208 and causes the camera to zoom in or out based on the user input. As yet another example, the camera controller 212 controls auto focus functionality of the camera.

The mobile device 202 further includes an augmented reality application 210. The augmented reality application 210 displays information and images associated with locations within relative proximity of the mobile device 202. The information and images are displayed as annotations overlaid on top of real-time or pseudo real-time images captured by the camera. For example, a user of the mobile device 202 directs the camera towards a building. The camera controller 212 receives image data from the camera and provides the image data to the display controller 206. The display controller 206 causes the display screen 203 to display images of the building captured by the camera in real-time. The augmented reality application 210 communicates with the display controller 206 to cause information associated with the building to be displayed on or near the real-time images of the building displayed on the display screen 203. In some implementations, information associated with the building includes the name of the building, the address of the building, businesses located within the building, or historical information about the building.

Still referring to FIG. 2, in accordance with some implementations, the augmented reality application 210 uses a GPS Unit 218 of the mobile device 202 to determine the location of the mobile device 202. For example, the GPS Unit 218 receives signals from one or more global positioning satellites. The GPS Unit 218 uses the signals to determine the current location of the mobile device 202. In some implementations, rather than the GPS Unit 218, the mobile device 202 includes a module that determines a location of the mobile device 202 using transmission tower triangulation or another method of location identification. In some implementations, the mobile device 202 uses location information that is determined using the GPS Unit 218 to identify geo-coded information that is associated with the location of the mobile device 202. In such implementations, location information obtained or determined by the GPS Unit 218 is provided to the augmented reality application 210. In some implementations, the augmented reality application 210 uses the location information to identify geo-coded data 226 stored on the mobile device 202.

The geo-coded data 226 includes information associated with particular geographic locations. For example, geo-coded data can include building names, business names and information, historical information, images, video files, and audio files associated with a particular location. As another example, geo-coded data associated with a location of a park may include hours for the park, the name of the park, information on plants located within the park, information on statues located within the park, historical information about the park, and park rules (e.g. "no dogs allowed"). The augmented reality application 210 can use the current location of the mobile device 202 to identify information associated with geographic locations that are in close proximity to the location of the mobile device 202. In some implementations, the geo-coded data 226 is stored on a memory of the mobile device 202, such as a hard drive, flash drive, or SD card. In some implementations, the mobile device 202 may contain no pre-stored geo-coded data. In some implementations, none of the geo-coded data 226 stored on the mobile device 202 is associated with locations within relative proximity to the current location of the mobile device 202.

In some implementations, the augmented reality application 210 uses the wireless interface 220 to obtain geo-coded data from a remote server 232 through a network 230. In such implementations, augmented reality application 210 provides the current location of the mobile device 202 to the wireless interface 220 which in turn transmits the current location to the remote server 232 through the network 230. The remote server 232 accesses a database of geo-coded data 234 and identifies geo-coded data associated with locations within a predetermined proximity of the current location of the mobile device 202. For example, the remote server 232 may identify all geo-coded data 226 that is associated with locations within five miles of the current location of the mobile device 202. The remote server 232 then returns the identified geo-coded data to the mobile device 202 through the network 230.

The augmented reality application 210 uses a compass unit 216 of the mobile device 202 to determine a current viewing direction, within the horizontal plane, of the camera. In other words, the compass unit 216 determines a direction in which a user of the mobile device 202 is looking while using the augmented reality application 210. Viewing direction information provided by the compass unit 216 can be used to determine a current viewing scope of the camera. In some implementations, the augmented reality application 210 will provide viewing direction information obtained from the compass unit 216 to the remote server 232 using the wireless interface 220. In such implementations, the remote server 232 uses the viewing direction information to further narrow the amount of geo-coded data 234 identified as relevant geo-coded data. For example, the remote server 232 will identify only geo-coded data that are associated with locations within relative proximity to the current location of the mobile device 202 and within a viewing scope defined by the viewing direction information as being relevant. The remote server 232 then transmits the identified relevant geo-coded data to the mobile device 202.

In other implementations, the remote server 232 does not use viewing direction information to determine relevant geo-coded data. In such implementations, the remote server 232 identifies geo-coded data associated with locations within relative proximity to the mobile device 202. The mobile device 202 then stores the geo-coded data received from the remote server 232 as a portion of the geo-coded data 226. The augmented reality application 210 uses the current viewing direction information provided by the compass unit 216 to identify geo-coded data received from the remote server 232 that is within the current viewing scope of the camera. The augmented reality application 210 uses the identified geo-coded data to create annotations and, in conjunction with the display controller 206, overlays the annotations over real-time or pseudo real-time images captured by the camera and displayed on the display screen 203. The augmented reality application 210 further uses the viewing direction information and the location information to determine positions on the screen where the annotations are to be positioned. For example, the augmented reality application 210 uses geo-coded data to generate several annotations which include business names and descriptions. The annotations are placed over images of the buildings in which the businesses are located within the images captured by the camera.

In some implementations, the mobile device 202 further includes an accelerometer unit 214 for determining a vertical angle of the mobile device 202. In some implementations, vertical angle information generated by the accelerometer unit 214 is provided to the remote server 232 and used to further narrow the geo-coded data that is identified by the remote server 232 and provided to the mobile device 202. In other implementations, the vertical angle information is used by the augmented reality application 210 to identify geo-coded data that is currently within the view of the camera from among a larger set of geo-located data provided by the remote server 232. In some implementations, the augmented reality application 210 uses vertical angle information to more accurately position annotations over images captured by the camera and displayed on the display screen 203. The accelerometer unit 214 may additionally include mechanisms such as a gyroscope and magnetometer to measure one or more additional parameters that can be used to better understand the location, orientation, and movement of the device. For example, a gyroscope may be used to perform dead-reckoning navigation in known manners so as to accurately identify a position of the device relative to an identified basepoint.

As one example using the accelerometer unit 214, a user may position the mobile device 202 so that the vertical viewing angle of the camera is generally horizontal. The augmented reality application 210 uses location, viewing direction, and vertical angle information to create annotations and place the annotations over images captured by the camera. Still following this example, the user then changes the vertical angle of the mobile device 202 so that the camera is facing a direction that is 45 degrees above horizontal, without changing the geographic location or horizontal viewing direction of the mobile device 202. The change in vertical angle can cause the augmented reality application 210 to change the position of annotations on the display screen 203 as well as change what annotations are displayed. For example, annotations associated with buildings that are no longer in view after the vertical angle of the mobile device 202 is changed can be removed from the display. As another example, changing the vertical angle may cause additional buildings, such as sky scrapers, to come into view. The augmented reality application 210 can generate annotations based on geo-located data associated with the locations of the buildings and place the newly generated annotations on the display screen 203 over images of the additional buildings.

The mobile device 202 optionally includes a range finding module 224 for determining the distance between the mobile device 202 and buildings or objects depicted in images captured by the camera. For example, the mobile device 202 can include a laser range finder for sending and receiving laser pulses. The laser range finder sends a laser pulse which can reflect off of a building or object. The reflected laser pulse is then received by the laser range finder. The range finding module 224 can control the laser range finder and calculate the amount of time between when the laser pulse is sent and when the reflected laser pulse is received. This time differential can be used to calculate the distance between the mobile device 202 and the building or object off of which the laser pulse is reflected. In some implementations, triangulation, sonar, radar, stadiametric, or coincidence rangefinders can be used to determine distance between the mobile device 202 and buildings or objects within view of the camera.

In some implementations, the augmented reality application 210 uses distance measurements provided by the range finding module 224 along with location, viewing direction, and vertical angle data to more accurately determine which objects and buildings are within the view of the camera. For example, the augmented reality application 210 can use distance measurement information to determine the geographic location of a building within view of the camera, based on the location of the mobile device 202. The augmented reality application 210 can then use the geographic location of the building to request more accurate geo-coded data from the remote server 232 or to better filter geo-coded data received from the remote server 232 to more accurately ensure that only data associated with the location of the building is shown as annotations over the building within images displayed on the display screen 203.

In some implementations, information about buildings, objects, or locations that are not within immediate view of a camera on the device 202 are displayed as annotations. For example, the only object within immediate view of the camera may be a brick wall. The augmented reality application 210 can then generate annotations for businesses, buildings, and locations that are within relative proximity to the mobile device 202 and in the viewing direction of the mobile device 202, but not within the immediate view of the camera. The augmented reality application 210 can cause annotations to be placed on the display screen 203 to indicate the general directions of the locations associated with the annotations. In some implementations, the annotations can include distances to indicate how far away particular businesses or locations are located. For example, an annotation can read "Metro: 0.8 miles" to indicate that a Metro stop is 0.8 miles away in the general direction of where the annotation is located on the screen. As another example, an annotation can read "Schaper Park: 1.1 miles" to indicate that Schaper Park is located 1.1 miles away.

In some implementations, in addition to location or positional data, the augmented reality application 210 can use search terms, key words, or user preferences to identify geo-coded information to display as annotations. For example, a user can enter in a search string or otherwise indicate a search term of "pizza." In some implementations, the augmented reality application 210 supplies the search string along with location and viewing direction data to the remote server 232. The remote server then returns geo-coded data related to pizza places in relative proximity to the mobile device 202 and within the viewing direction of the mobile device 202. In other implementations, the mobile device 202 receives a large set of geo-coded data associated with locations in relative proximity to the mobile device 202. The augmented reality application 210 then uses the search string to identify geo-coded data within the large set of geo-coded data that is associated with pizza places. The augmented reality application 210 can then generate annotations that include information about the pizza places which can be displayed on the display screen 203. A user of the mobile device 202 can then select one of the annotations to bring up additional information about the selected pizza place or to call the pizza place.

Still referring to FIG. 2, in accordance with some implementations, the mobile device 202 includes user data 228. The user data 228 can include user preferences or other information associated with a user of the mobile device 202. For example, the user data 228 can include a list of contacts. Some of the contacts may be associated with addresses. If an address associated with a contact is in relative proximity to the mobile device 202 and within the viewing range of the camera, the augmented reality application 210 can provide an annotation showing information about the contact. For example, the augmented reality application 210 can create an annotation that includes the text "Dave: work" to indicate that the contact "Dave" has a work address within the viewing direction of the camera. Following this argument, the user can select a portion of the annotation displayed on the display screen 203 to bring up information about Dave, call Dave, or to generate a text message or e-mail addressed to Dave.

As another example, user data 228 includes notes or images created by a user and associated with a particular location. For example, the user can use the camera to take a picture. The user than stores the picture on the mobile device 202 and associates the picture with GPS coordinates of where the picture was taken. The augmented reality application 210 can later access the stored picture and display the picture as an annotation when the mobile device 202 is in relative proximity to the location associated with the picture and the location is within the viewing direction of the camera. As another example, the user can write notes about a restaurant. The augmented reality application 210 can later create and display an annotation which includes the notes about the restaurant when the address of the restaurant is within relative proximity to the mobile device 202 and within the viewing direction of the camera.

In some implementations, the user data 228 includes indications of user preferences. For example, historical searching data associated with a user of the mobile device 202 may indicate that the user has an interest in museums and art. In this example, the augmented reality application 210 elects to display geo-coded information related to museums, art galleries, art stores, and public art (i.e. statues, murals, etc.) that are within the viewing range of the mobile device 202 when the user has not indicated a specific search string. As another example, the user data 228 may indicate a historical preference for Italian food. The augmented reality application 210 can create and present annotations associated with Italian restaurants within viewing range of the mobile device 202 when the user has not indicated a specific search string.

Still referring to FIG. 2, in accordance with some implementations, the communications system 200 includes image comparison functionality for comparing images captured by the camera of the mobile device 202 to pre-stored, geo-coded images. In some implementations, the pre-stored images are part of the geo-coded data 226 stored on the mobile device 202. In other implementations, the pre-stored images are part of the geo-coded data 234 stored at the remote server 232. In such implementations, the remote server 232 can further include an image comparison unit 236 for comparing images captured by the mobile device 202 to pre-stored images stored as part of the geo-coded data 234.

As an example, the camera of the mobile device 202 is used to capture an image of a statue. The augmented reality application 210 then provides the captured image obtained by camera of the mobile device 202 to the wireless interface 220 which in turn transmits the captured image to the remote server 232 through the network 230. In some implementations, positional information such as the current location of the mobile device 202, the viewing direction of the mobile device 202 and the vertical viewing angle of the mobile device 202 are also transmitted by the wireless interface 220 to the remote server 232 through the network 230. The remote server 232 uses the positional information to identify geo-coded, pre-stored images associated with locations that are within relative proximity to the mobile device 202 and within the viewing direction of the camera of the mobile device 202.

In some implementations, the image comparison unit 236 identifies characteristic points of the captured images and the identified pre-stored images. For example, characteristic points of the outline and features of the statue can be identified. In some implementations, characteristic points of the pre-stored images may have been pre-determined either by the image comparison unit 236 or by a different module running on the remote server 232 or on a different computer or server. The image comparison unit 236 compares the characteristic points of the captured images and the identified pre-stored images to determine if any of the pre-stored images match the captured image. Following the above example, if a pre-stored image is found to match the capture image, the pre-stored image is identified as an image of the statue. The identified pre-stored image is then supplied to the mobile device 202 through the network 230. The augmented reality application 210 then creates an annotation which includes the pre-stored image of the statue provided by the remote server 232 and presents the annotation to the user overlaid on top of or near the image of the statue captured by the mobile device 202 that is displayed on the display screen 203. In some implementations, rather than comparing characteristic points of the captured image and the pre-stored images, the image comparison unit 236 can identify outlines of one or more objects within the captured image and compare the outlines to outlines of one or more objects within the pre-stored images. If the outlines in the captured image match outlines of a pre-stored image, it is determined that the pre-stored image is an image of the same objects depicted in the captured image. In some implementations, the image comparison functionality of the image comparison unit 236 is performed by the augmented reality application 210 on the mobile device 202 rather than by the image comparison unit 236.

In some implementations, information associated with the identified, matching, pre-stored image is also provided to the mobile device 202 by the remote server 232. For example, the remote server 232 can provide an indication whom the statue is a statue of, information related to text printed on or near the statue, or historical information about when the statue was created and the artist who created it. As another example, the remote server 232 can provide biographic information about the person whom the statue is of, or the artist that created the statue. This information provided by the remote server 232 can be used by the augmented reality application 210 to create annotations for display on the display screen 203.

In some implementations, upon determining that a pre-stored image matches the captured image, the image comparison unit 236 can determine an offset between the position at which the pre-stored image was taken from and the position of the mobile device when the captured image was taken. The difference in position and distance between various characteristic points of the two images can be compared to determine the offset. In some implementations, such offsets can be used to calibrate the GPS Unit 218, the Compass Unit 216, the Accelerometer Unit 214, or the Range Finding Module 224 of the mobile device 202.

Figure 3:
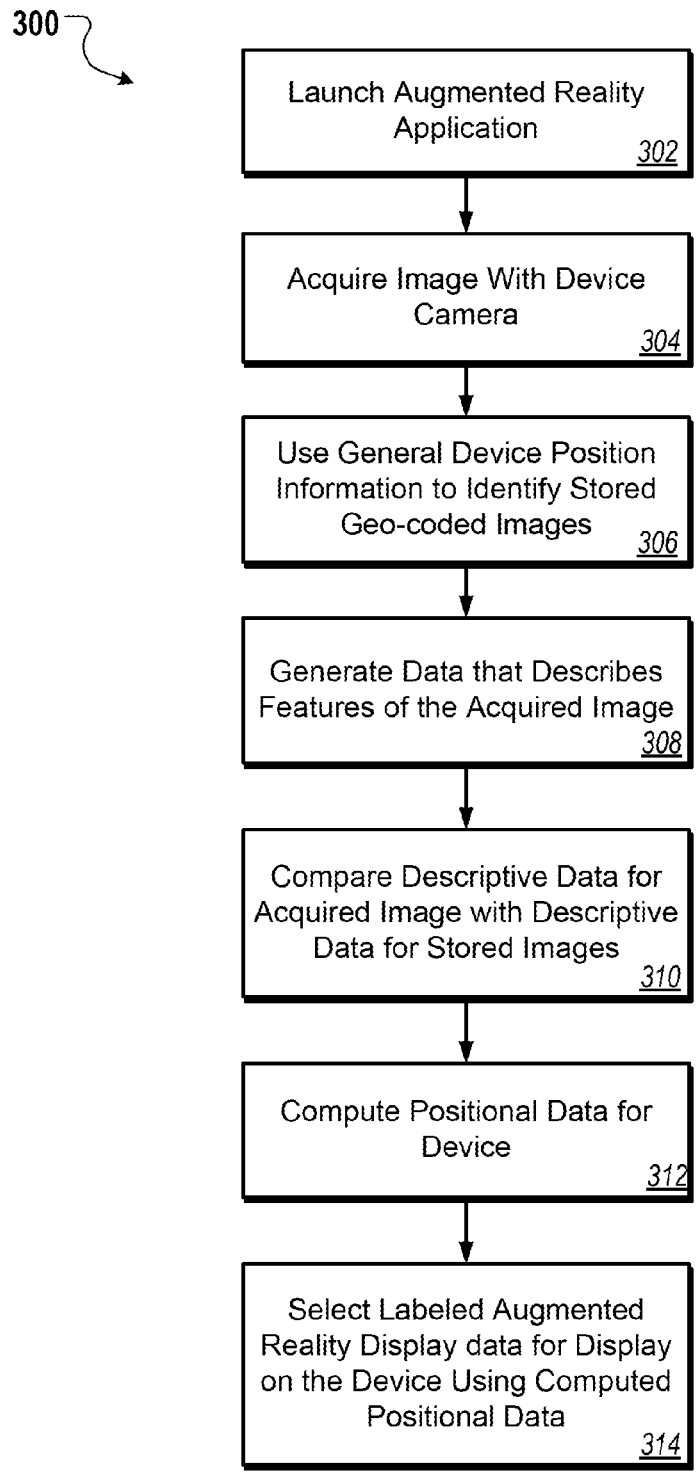
FIG. 3 is a flow chart showing a process for determining location in an augmented reality system using an image acquired by a computing device at a location.

FIG. 3 shows a flow chart of a process 300 for determining location in an augmented reality system using an image acquired by a computing device at a location. Step 302 of the process 300 launches an augmented reality application. For example, referring to FIG. 1, a user of the mobile device 102 can use touch screen functionality of the display screen 104 to scroll through a list of applications and select an augmented reality application. This causes the mobile device 102 to execute the augmented reality application.

Step 304 acquires an image with a device camera. For example, referring to FIG. 1, the mobile device 102 includes a camera for capturing still images and video images. The camera captures an image of the surroundings of the mobile device 102. In some implementations, the mobile device 102 displays some or all of the image captured by the camera on the display screen 104. In some implementations, the camera captures a still image. In some implementations, the camera captures video footage. A still image can then be created from the video footage captured by the camera.

Step 306 uses general device position information to identify stored geo-coded images. For example, referring to FIG. 2, the mobile device 202 uses the GPS Unit 218 to determine a geographic location of the mobile device 202. The mobile device can also use the compass unit 216 to determine a viewing direction of the camera and the accelerometer unit 214 to determine a vertical viewing angle of the camera. The general device position information generated by one or more of these components can be used to identify geo-coded images from the store of geo-coded data 226 that is associated with locations within relative proximity of the mobile device 202 or within a viewing direction of the mobile device 202. In some implementations, the mobile device 202 transmits some or all of the general device position information to the remote server 232. The remote server then uses the general device position information to identify geo-coded images from the store of geo-coded data 234 that is associated with locations within relative proximity of the mobile device 202 or within a viewing direction of the mobile device 202. In some implementations, some geo-coded data is stored at the remote server 232 and other geo-coded data is stored at the mobile device 202. For example, geo-coded information created by a user of the mobile device 202, or associated with the user (e.g. home address, addresses of favorite restaurants, etc.) may be stored on the mobile device 202 as part of the geo-coded data 226 to facilitate ease of access to the geo-coded data. Other, more general geo-coded data, such as business names and locations, may be stored by the remote server 232 as part of the geo-coded data 234. The more general geo-coded data may be stored by the remote server 232 since there is a greater amount of general geo-coded data than user specific data. The more general geo-coded data may also be stored by the remote server 232 because the more general geo-coded data is updated more frequently from various sources than locally stored, user specific geo-coded data.

Step 308 generates data that describes features of the acquired image. For example, referring to FIG. 1, the server 110 identifies characteristic points and edges of objects depicted in the image 112. In some implementations, the process of identifying characteristic points and edges within the image 112 is performed by the mobile device 102. The pixels that make up the image 112 may be analyzed to determine if a characteristic point or edge is present by detecting the similarities between a patch of pixels centered on the pixel being analyzed and nearby, partially overlapping patches of pixels. If the pixel is in a region of uniform intensity, then the nearby patches will look similar. If the pixel is on an edge, then nearby patches in a direction perpendicular to the edge will look quite different, but nearby patches in a direction parallel to the edge will result only in a small change. The pixel can be identified as a corner characteristic point if the analysis detects variation in all directions, (i.e. none of the nearby patches appear similar). In some implementations, other methods of identifying attributes of the acquired image are used. For example, the acquired image can be analyzed in order to create outlines of objects depicted in the acquired image.

Step 310 compares descriptive data for the acquired image with descriptive data for stored images. For example, referring to FIG. 1, one or more stored images are identified. The stored images may be identified based on location information associated with the images and general device position information associated with the mobile device 102. In some implementations, stored images associated with locations that are in relative proximity to the mobile device 102 are identified as being relevant. Characteristic points, edges, or outlines created using the image 112 can be compared to characteristic points, edges, or outlines of the identified stored images. If characteristic points, edges, or outlines compared between the image 112 and a stored image have a high matching value, it can be determined that the images depict the same object or objects. In some implementations, characteristic points, edges, or outlines associated with a stored image are pre-generated and stored. In some implementations, characteristic points, edges, or outlines associated with a stored image are generated by the server 110.

Step 312 computes positional data for the device. For example, as described above with reference to FIG. 1, differences between characteristic points identified for the acquired image and characteristic points identified in a corresponding identified matching stored image can be used to calculate an offset between the two images. The offset, along with a known location for the position at which the identified matching stored image was captured can be used to determine a location at which the acquired image was captured. This calculated location can then be provided to the device. In some implementations, the calculated location is used by the device to calibrate a GPS unit, compass, or accelerometer of the device.

Step 314 selects labeled augmented reality display data for display on the device using computed positional data. For example, referring to FIG. 2, the computed positional data may indicate a geographic location of the mobile device 202, a viewing direction within the horizontal plane of the mobile device 202, and a vertical viewing angle of the mobile device 202. This information can be used to determine locations that are within the viewing scope of the mobile device 202. A store of geo-coded data (geo-coded data 226, 234, or both) is searched in order to identify geo-coded data associated with locations within the viewing scope of the mobile device 202. In some implementations, identified geo-coded data is further narrowed down using search terms. For example, a user of the mobile device 202 types in or otherwise indicates a search string. In this example, only geo-coded data that is a hit for the search string is identified as being relevant. The identified geo-coded data is used to create annotations containing information about locations within the viewing scope of the mobile device 202. These annotations are then displayed on the display screen 203. In some implementations, the annotations are displayed on top of a real-time or near real-time image captured by the camera of the mobile device 202. In some implementations, a user selects an annotation in order to cause more information associated with the annotation or with a location associated with the annotation to be displayed on the display screen 203.

Figure 4:
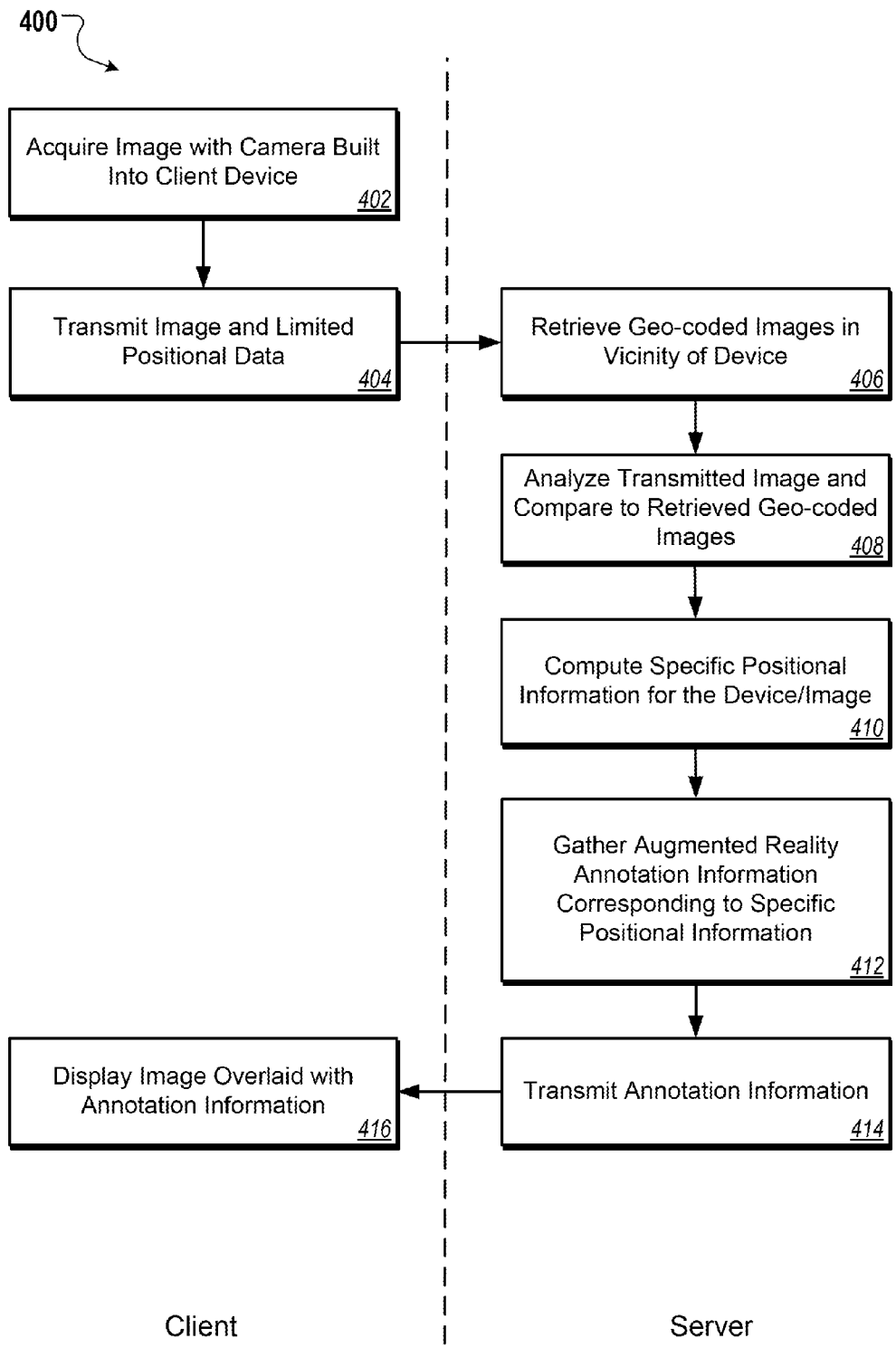
FIG. 4 is a swim lane diagram showing actions performed by an example client and server for determining location in an augmented reality system.

FIG. 4 is a swim lane diagram 400 showing actions performed by an example client and server for determining location in an augmented reality system. Step 402 acquires an image with a camera built into a client device. For example, referring to FIG. 1, the mobile device 102 includes captures still images and video images using a built in camera. The camera captures images of the surroundings of the mobile device 102. In some implementations, the mobile device 102 displays some or all of the image captured by the camera on the display screen 104. In some implementations, a still image is created from the video footage captured by the camera.

Step 404 transmits the acquired image and limited positional data. In some implementations, the client device may use a method for determining position that is not entirely accurate. For example, the client device may use transmission tower triangulation in order to determine a general location for the client device. In other implementations, general location information may be entered in by a user of the client device. For example, the user can type in "downtown San Francisco" to indicate a general location for the client device. In yet other implementations, the client device may use the location of a transmission tower (e.g. a cellular tower) to indicate a city, zip code, or general location for the client device. This limited positional data is then transferred to a server along with the acquired image. For example, the limited positional data and acquired image can be transmitted to a cellular tower using a wireless interface of the client device. The transmitted data is then routed through a network to the server.

Step 406 retrieves geo-coded images associated with locations in the vicinity of the client device. In some implementations, the vicinity of the client device is defined as a predefined radius around the client device. In other implementations, the definition of the vicinity of the client device can be refined using compass or viewing angle data provided by the client device. In some implementations, the vicinity of the client device is the city or the zip code in which the client device or a transmission tower in communication with the client device is located. A store of geo-coded data is accessed, and images contained within the store of geo-coded data that are associated with locations in the vicinity of the client device are identified.

Step 408 analyzes the transmitted image and compares the transmitted image to the retrieved geo-coded images. For example, referring to FIG. 1, the server 110 identifies characteristic points and edges of objects depicted in the image 112. The pixels that make up the image 112 may be analyzed to determine if a characteristic point or edge is present by detecting the similarities between a patch of pixels centered on the pixel being analyzed and nearby, partially overlapping patches of pixels. In some implementations, other methods of identifying attributes of the acquired image are used. For example, the acquired image can be analyzed in order to create outlines of objects depicted in the acquired image. Characteristic points, edges, or outlines created using the image 112 can be compared to characteristic points, edges, or outlines of the retrieved geo-coded images. If characteristic points, edges, or outlines compared between the image 112 and a retrieved geo-coded image have a high matching value, it can be determined that the images depict the same object or objects. In some implementations, characteristic points, edges, or outlines associated with a retrieved geo-coded image are pre-generated and stored. In some implementations, characteristic points, edges, or outlines associated with a retrieved geo-coded image are generated by the server 110.

Step 410 computes specific positional information for the device and/or acquired image. For example, as described above with reference to FIG. 1, differences between characteristic points identified for the acquired image and characteristic points identified in a corresponding identified matching geo-coded image can be used to calculate an offset between the two images. The offset, along with a known location for the position at which the identified matching geo-coded image was captured can be used to determine a specific location at which the acquired image was captured. For example, the server may determine, based on differences in distance between the characteristic points of the acquired image and the identified matching geo-coded image, that the acquired image was captured from the same viewing direction as the identified matching geo-coded image, but from a greater distance away from an object depicted in both images. The server can use the differences in distance between the characteristic points of the two images to calculate a difference in distance between where the acquired image was captured and where the identified matching geo-coded image was captured. This distance can be used in conjunction with a known location from where the identified matching geo-coded image was captured in order to determine a location from which the acquired image was captured. This determined location can be identified as a specific location of the client device.

Step 412 gathers augmented reality annotation information corresponding to the specific positional information. For example, referring to FIG. 2, the specific positional information can be used to determine locations that are within proximity to mobile device 202. A store of geo-coded data (geo-coded data 226, 234, or both) is searched in order to identify geo-coded data associated with locations within proximity of the mobile device 202. In some implementations, identified geo-coded data is further narrowed down using search terms. For example, a user of the mobile device 202 types in or otherwise indicates a search string. In this example, only geo-coded data that is a hit for the search string is identified as being relevant. The identified geo-coded data is used to create annotations containing information about locations within proximity of the mobile device 202.

Step 414 transmits annotation information to the to the client device. In some implementations, annotations associated with locations within proximity to the client device in every direction are transmitted to the client device. In some implementations, only annotation information associated with locations within the viewing scope of the client device are transmitted. In various implementations, the server can transmit information associated with locations in proximity to the client device, specific annotations to be displayed by the client device, or an annotated version of the acquired image supplied by the client device.

Step 416 displays the acquired image overlaid with annotation information. In some implementations, an annotated version of the acquired image is provided by the server and the client device simply displays the annotated acquired image. In some implementations, the client device receives annotations and information on where to place the annotations with respect to the acquired image. The client device then displays the acquired image with the annotations overlaid on the acquired image. The annotations correspond to locations depicted in the acquired image, or to locations that are in the viewing direction of the client device but are not in the immediate viewing area of the client device. In some implementations, the client device receives annotation information and the annotations and placement information for the annotations is generated by the client device.

These annotations are then displayed on the display screen 203. In some implementations, the annotations are displayed on top of a real-time or near real-time image captured by the camera of the mobile device 202. In some implementations, a user selects an annotation in order to cause more information associated with the annotation or with a location associated with the annotation to be displayed on the display screen 203.

Figure 5:
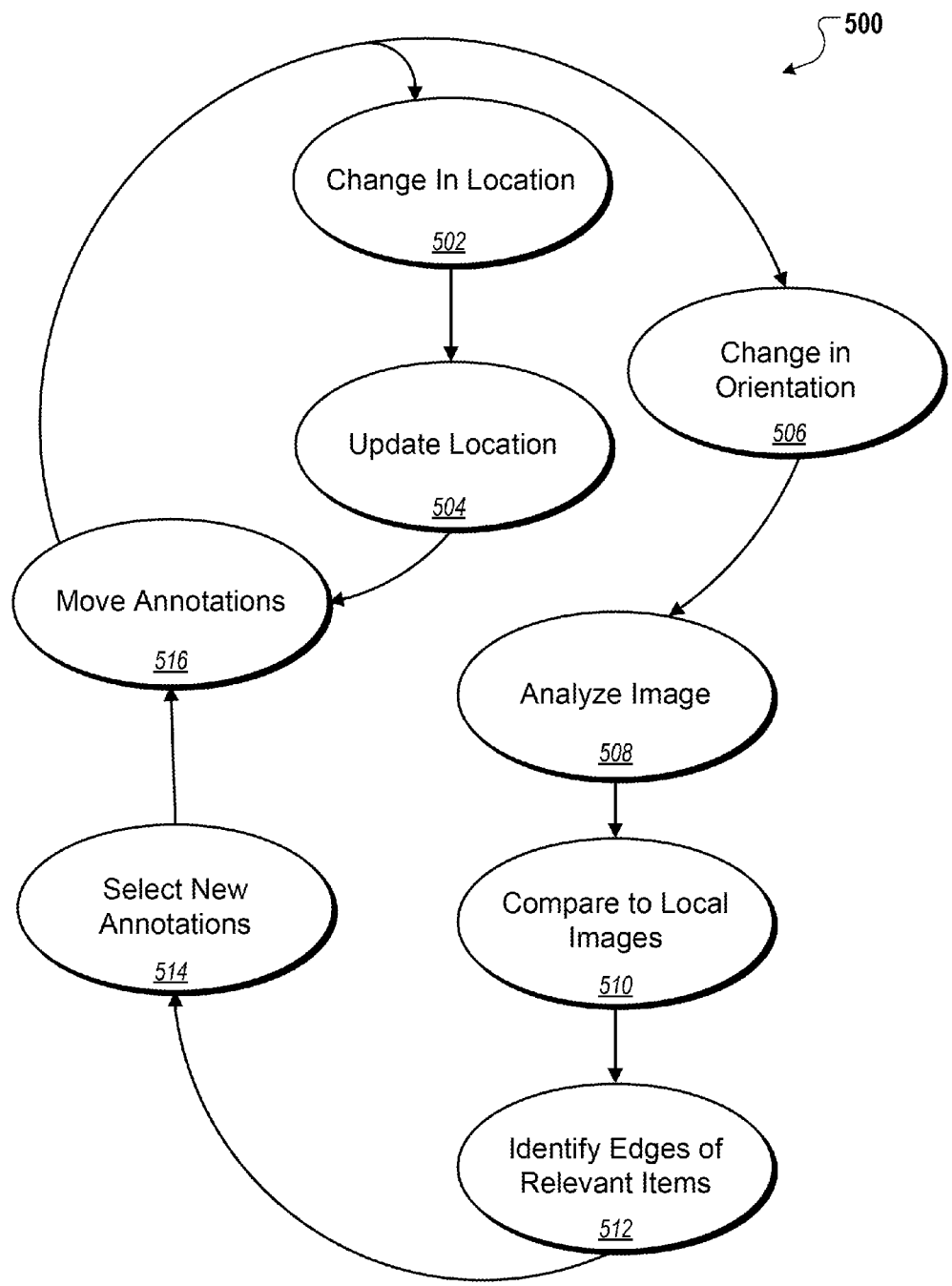
FIG. 5 is a flow diagram of actions taken in an augmented reality system.

FIG. 5 is a flow diagram 500 of actions taken in an augmented reality system. At stage 502, the location of a client device is changed. For example, a user with a mobile device running an augmented reality application is walking down a city street, thus causing the position of the mobile device to change. As the user moves, the orientation of the mobile device (i.e. viewing direction within the horizontal plane and vertical viewing angle) remains the same. This can cause images of items captured by a camera of the mobile device to become larger or smaller within the viewing area of the camera as the user moves closer or further away from the items in the image.

At stage 504, the location of the client device is updated. For example, the client device includes a GPS unit configured to receive signals from one or more global positioning satellites and use the signals to determine the current location of the client device. As a user of the client device moves, the GPS unit updates the geographic location of the client device. As another example, the client device may include a positioning unit for determining the position of the client device based on transmission tower triangulation. In some implementations, the client device will transmit updated location information to a remote computing device.

At Stage 516, annotations are moved within a display of the client device. For example, as a user moves towards a group of buildings, the buildings will appear larger on the display. The an augmented reality application of the client device can cause the annotations to move on the display so that the annotations remain aligned with the buildings or locations they are associated with. In some implementations, the process of determining where annotations should be placed on the display is performed by a remote computing device. In such implementations, the client device sends positional information to the remote computing device. The remote computing device then calculates where annotations are to be placed on the display of the client device and transmits this information back to the client device. The client device then displays the annotations on the display as indicated by the remote computing device. After annotations have been moved, the user may once again change location (stage 502), therefore causing the location of the mobile device to change.

At stage 506, a change in orientation of the client device occurs. In some implementations, the change in orientation occurs after stage 516 has occurred. The change in orientation can include a change in the viewing direction within the horizontal plane of the client device, a change in the vertical viewing angle of the client device, or both. In some implementations, a change in orientation can occur along with a change in location. A change in orientation occurs when a user of the client device swivels the client device from side to side or up and down. The change in orientation causes new items to come into view of a camera of the client device. When a change in orientation occurs, a compass of the client device can determine the new viewing direction of the mobile device and an accelerometer of the client device can determine the new vertical viewing angle of the client device. In some implementations, this updated viewing orientation information is sent to a remote computing device.

At stage 508, an image captured by the client device is analyzed. For example, a camera of the client device captures images at regular intervals. When a change in orientation occurs, a captured image associated with the new orientation is analyzed to determine characteristic points or edges of items depicted in the image. In some implementations, this analysis is performed by the client device. In other implementations, the image and positional information are transmitted to a remote computing device and the remote computing device performs the analysis.

At stage 510, the captured image is compared to local images. For example, in implementations in which the captured image and positional data are transmitted to a remote computing device, the remote computing device can use location information and orientation information to identify geo-coded images associated with locations within relative proximity of the client device, or within a viewing direction of the client device. The remote computing device then compares characteristic points or outline images associated with the identified geo-coded images to characteristic points or outline images associated with the captured image to determine if any of the geo-coded images are a match for the captured image. If a match occurs, information associated with the matching geo-coded image can be associated with the captured image. For example, the matching geo-coded image may be an image of the Washington monument. The captured image can then be identified as an image of the Washington monument and information associated with the Washington monument can be used to create annotations for the captured image.

At stage 512, edges of relevant items within the captured image are identified. This functionality can be performed by either the client device or the remote computing device. The edges of the relevant items in the captured image are identified so that annotations associated with each item can be correctly overlaid on the captured image when displayed on the client device.

At stage 514, new annotations are selected. When the orientation of the client device is changed, new items will come into view of the camera of the client device. The remote computing device or the client device selects new annotations associated with items that are now within the viewing scope of the camera that had not previously been within the viewing scope of the camera. These annotations include information or images associated with the items within the viewing scope of the camera. Information associated with the identified edges of the items is used to place the annotations on the display of the client device so that the annotations are displayed over or near the items they relate to.

At step 516, annotations are moved within the display as described above. For example, as the orientation of the client device changes, a previously viewed item remains within the viewing scope of the camera. Annotations associated with the previously viewed item are moved within the display so that the annotations continue to be located on or near the previously viewed item.

Figure 6:
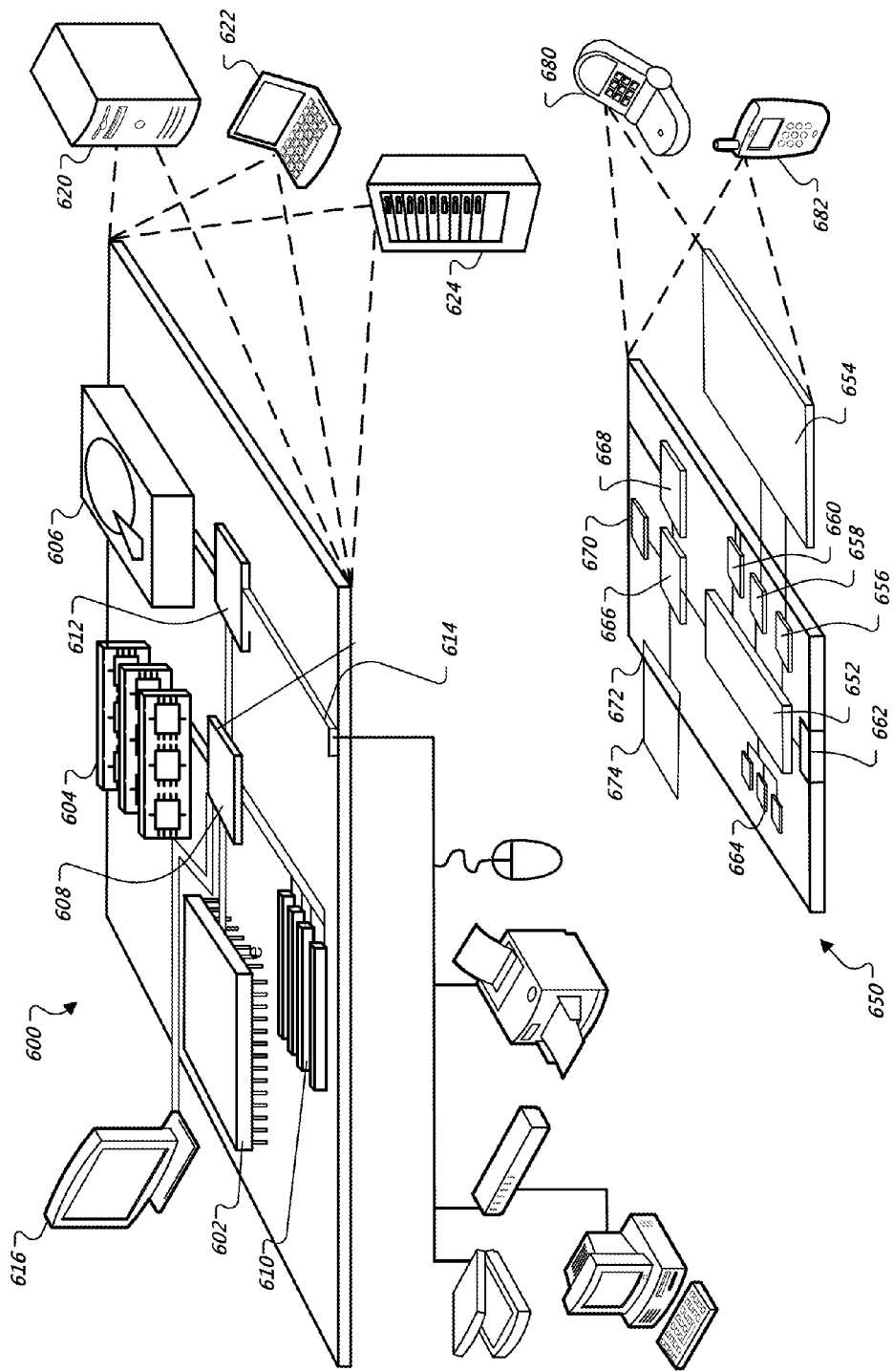
FIG. 6 is a block diagram of computing devices that may be used to implement the systems and methods described in this document, as either a client or as a server or plurality of servers.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Figure 7:
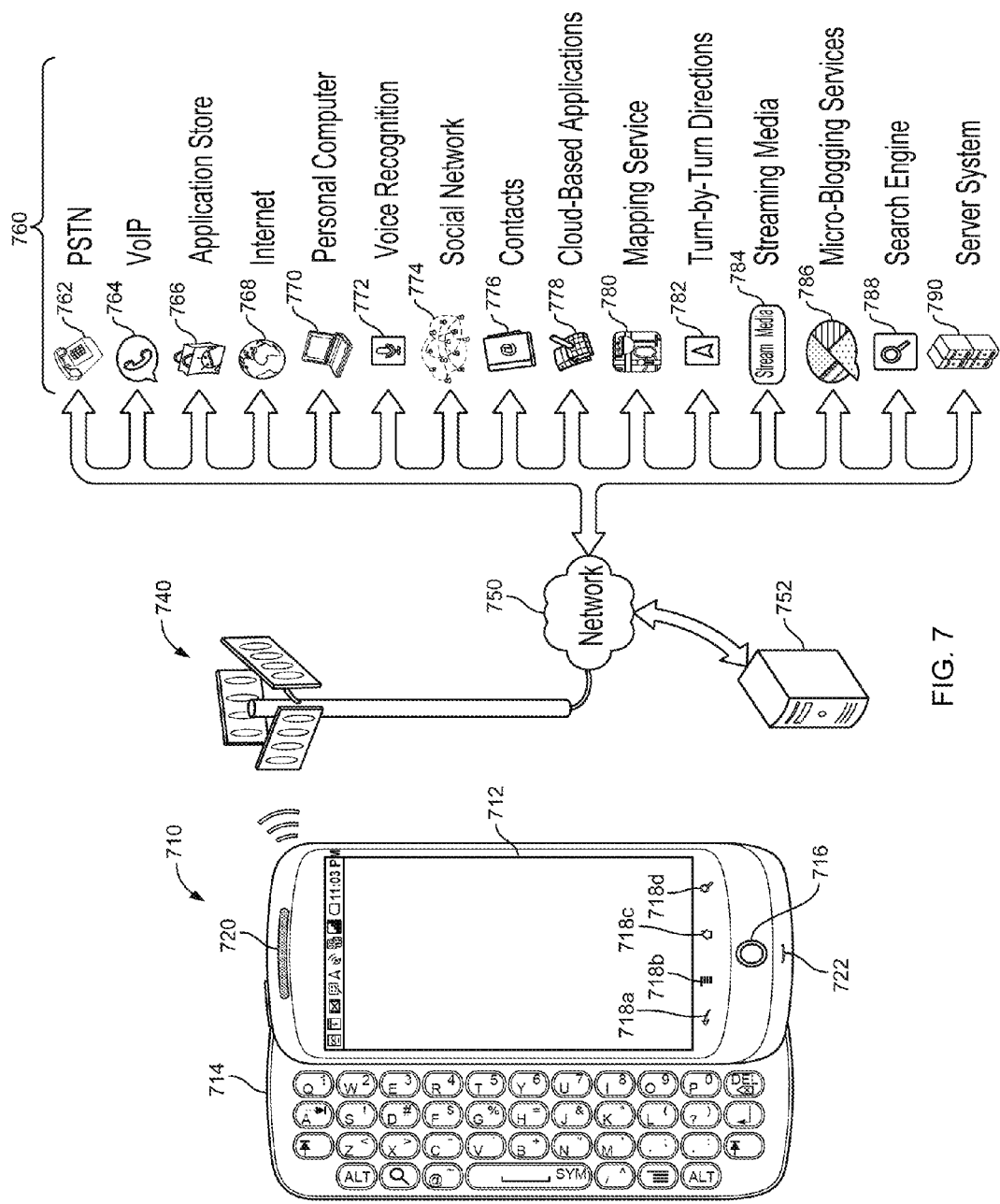
FIG. 7 is a conceptual diagram of a system that may be used to implement the systems and methods described in this document.

Referring now to FIG. 7, a conceptual diagram of a system that may be used to implement the systems and methods described in this document is illustrated. In the system, mobile computing device 710 can wirelessly communicate with base station 740, which can provide the mobile computing device wireless access to numerous hosted services 760 through a network 750.

In this illustration, the mobile computing device 710 is depicted as a handheld mobile telephone (e.g., a smartphone, or application telephone) that includes a touchscreen display device 712 for presenting content to a user of the mobile computing device 710 and receiving touch-based user inputs. Other visual, auditory, and tactile output components may also be provided (e.g., LED lights, a speaker for providing tonal, voice-generated, or recorded output, or vibrating mechanisms for tactile output), as may various different input components (e.g., keyboard 714, physical buttons, trackballs, accelerometers, gyroscopes, and magnetometers).

Example visual output mechanism in the form of display device 712 may take the form of a 3.7 or 4.3 inch LED or AMOLED display with resistive or capacitive touch capabilities, for displaying video, graphics, images, and text, and coordinating user touch inputs locationally with the displayed information so that user contact above a displayed item may be associated with the item by the device 710. The mobile computing device 710 may take alternative forms also, including as a laptop computer, a tablet or slate computer, a personal digital assistant, an embedded system (e.g., a car navigation system), a desktop personal computer, or a computerized workstation.

An example mechanism for receiving user-input includes keyboard 714, which may be a full qwerty keyboard or a traditional keypad that includes keys for the digits '0-9' '*' and '#.' The keyboard 714 receives input when a user physically contacts or depresses a keyboard key. User manipulation of a trackball 716 or interaction with a trackpad enables the user to supply directional and rate of rotation information to the mobile computing device 710 (e.g., to manipulate a position of a cursor on the display device 712).

The mobile computing device 710 may be able to determine a position of physical contact with the touchscreen display device 712 (e.g., a position of contact by a finger or a stylus). Using the touchscreen 712, various "virtual" input mechanisms may be produced, where a user interacts with a graphical user interface element depicted on the touchscreen 712 by contacting the graphical user interface element. An example of a "virtual" input mechanism is a "software keyboard," where a keyboard is displayed on the touchscreen and a user selects keys by pressing a region of the touchscreen 712 that corresponds to each key.

The mobile computing device 710 may include mechanical or touch sensitive buttons 718a-d. Additionally, the mobile computing device may include buttons for adjusting volume output by the one or more speakers 720, and a button for turning the mobile computing device on or off. A microphone 722 allows the mobile computing device 710 to convert audible sounds into an electrical signal that may be digitally encoded and stored in computer-readable memory, or transmitted to another computing device. The mobile computing device 710 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 710 may present a graphical user interface with the touchscreen 712. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 704. User-selection of the button may invoke the pre-defined action.

In some examples, the operating system provides a "desktop" user interface that is displayed upon turning on the mobile computing device 710, activating the mobile computing device 710 from a sleep state, upon "unlocking" the mobile computing device 710, or upon receiving user-selection of the "home" button 718*c*. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 710 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 712 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 710 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 710 may include other application modules and hardware. A call handling unit may receive an indication of an incoming telephone call and provide a user capabilities to answer the incoming telephone call. A media player may allow a user to listen to music or play movies that are stored in local memory of the mobile computing device 710. The mobile telephone 710 may include a digital camera sensor, and corresponding image and video capture and editing software. An internet browser may enable the user to view content from a web page by typing in an addresses corresponding to the web page or selecting a link to the web page.

The mobile computing device 710 may include an antenna to wirelessly communicate information with the base station 740. The base station 740 may be one of many base stations in a collection of base stations (e.g., a mobile telephone cellular network) that enables the mobile computing device 710 to maintain communication with a network 750 as the mobile computing device is geographically moved. The computing device 710 may alternatively or additionally communicate with the network 750 through a Wi-Fi router or a wired connection (e.g., Ethernet, USB, or FIREWIRE). The computing device 710 may also wirelessly communicate with other computing devices using BLUETOOTH protocols, or may employ an ad-hoc wireless network.

A service provider that operates the network of base stations may connect the mobile computing device 710 to the network 750 to enable communication between the mobile computing device 710 and other computerized devices that provide services 760. Although the services 760 may be provided over different networks (e.g., the service provider's internal network, the Public Switched Telephone Network, and the Internet), network 750 is illustrated as a single network. The service provider may operate a server system 752 that routes information packets and voice data between the mobile computing device 710 and computing devices associated with the services 760.

The network 750 may connect the mobile computing device 710 to the Public Switched Telephone Network (PSTN) 762 in order to establish voice or fax communication between the mobile computing device 710 and another computing device. For example, the service provider server system 752 may receive an indication from the PSTN 762 of an incoming call for the mobile computing device 710. Conversely, the mobile computing device 710 may send a communication to the service provider server system 752 initiating a telephone call with a telephone number that is associated with a device accessible through the PSTN 762.

The network 750 may connect the mobile computing device 710 with a Voice over Internet Protocol (VoIP) service 764 that routes voice communications over an IP network, as opposed to the PSTN. For example, a user of the mobile computing device 710 may invoke a VoIP application and initiate a call using the program. The service provider server system 752 may forward voice data from the call to a VoIP service, which may route the call over the internet to a corresponding computing device, potentially using the PSTN for a final leg of the connection.

An application store 766 may provide a user of the mobile computing device 710 the ability to browse a list of remotely stored application programs that the user may download over the network 750 and install on the mobile computing device 710. The application store 766 may serve as a repository of applications developed by third-party application developers. An application program that is installed on the mobile computing device 710 may be able to communicate over the network 750 with server systems that are designated for the application program. For example, a VoIP application program may be downloaded from the Application Store 766, enabling the user to communicate with the VoIP service 764.

The mobile computing device 710 may access content on the internet 768 through network 750. For example, a user of the mobile computing device 710 may invoke a web browser application that requests data from remote computing devices that are accessible at designated universal resource locations. In various examples, some of the services 760 are accessible over the internet.

The mobile computing device may communicate with a personal computer 770. For example, the personal computer 770 may be the home computer for a user of the mobile computing device 710. Thus, the user may be able to stream media from his personal computer 770. The user may also view the file structure of his personal computer 770, and transmit selected documents between the computerized devices.

A voice recognition service 772 may receive voice communication data recorded with the mobile computing device's microphone 722, and translate the voice communication into corresponding textual data. In some examples, the translated text is provided to a search engine as a web query, and responsive search engine search results are transmitted to the mobile computing device 710.

The mobile computing device 710 may communicate with a social network 774. The social network may include numerous members, some of which have agreed to be related as acquaintances. Application programs on the mobile computing device 710 may access the social network 774 to retrieve information based on the acquaintances of the user of the mobile computing device. For example, an "address book" application program may retrieve telephone numbers for the user's acquaintances. In various examples, content may be delivered to the mobile computing device 710 based on social network distances from the user to other members. For example, advertisement and news article content may be selected for the user based on a level of interaction with such content by members that are "close" to the user (e.g., members that are "friends" or "friends of friends").

The mobile computing device 710 may access a personal set of contacts 776 through network 750. Each contact may identify an individual and include information about that individual (e.g., a phone number, an email address, and a birthday). Because the set of contacts is hosted remotely to the mobile computing device 710, the user may access and maintain the contacts 776 across several devices as a common set of contacts.

The mobile computing device 710 may access cloud-based application programs 778. Cloud-computing provides application programs (e.g., a word processor or an email program) that are hosted remotely from the mobile computing device 710, and may be accessed by the device 710 using a web browser or a dedicated program. Example cloud-based application programs include GOOGLE DOCS word processor and spreadsheet service, GOOGLE GMAIL webmail service, and PICASA picture manager.

Mapping service 780 can provide the mobile computing device 710 with street maps, route planning information, and satellite images. An example mapping service is GOOGLE MAPS. The mapping service 780 may also receive queries and return location-specific results. For example, the mobile computing device 710 may send an estimated location of the mobile computing device and a user-entered query for "pizza places" to the mapping service 780. The mapping service 780 may return a street map with "markers" superimposed on the map that identify geographical locations of nearby "pizza places."

Turn-by-turn service 782 may provide the mobile computing device 710 with turn-by-turn directions to a user-supplied destination. For example, the turn-by-turn service 782 may stream to device 710 a street-level view of an estimated location of the device, along with data for providing audio commands and superimposing arrows that direct a user of the device 710 to the destination.

Various forms of streaming media 784 may be requested by the mobile computing device 710. For example, computing device 710 may request a stream for a pre-recorded video file, a live television program, or a live radio program. Example services that provide streaming media include YOUTUBE and PANDORA.

A micro-blogging service 786 may receive from the mobile computing device 710 a user-input post that does not identify recipients of the post. The micro-blogging service 786 may disseminate the post to other members of the micro-blogging service 786 that agreed to subscribe to the user.

A search engine 788 may receive user-entered textual or verbal queries from the mobile computing device 710, determine a set of internet-accessible documents that are responsive to the query, and provide to the device 710 information to display a list of search results for the responsive documents. In examples where a verbal query is received, the voice recognition service 772 may translate the received audio into a textual query that is sent to the search engine.

These and other services may be implemented in a server system 790. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method, comprising:
obtaining, by a computer system, an image that was captured by a computing device;
identifying, by the computer system, image characterizing data for the obtained image, the image characterizing data identifying characteristic points of one or more items in the image;
obtaining, by the computer system, general device position information that indicates a geographic location at which the image was captured by the computing device and that was generated using information sensed by one or more position sensors of the computing device that sense geographic location information;
selecting, by the computer system, a plurality of geo-coded images based on the general device position information;
comparing the image characterizing data for the obtained image with image characterizing data for the plurality of geo-coded images;
determining, by the computer system and based on a result of comparing the image characterizing data for the obtained image with the image characterizing data for the plurality of geo-coded images, calculated device position information that indicates a refined geographic location at which the image was captured by the computing device; and
providing, by the computer system and to the computing device, calibration data for causing the computing device to calibrate, based on the calculated device position information, the one or more position sensors of the computing device that sense geographic location information.

2. The method of claim 1, further comprising:
providing, by the computer system and to the computing device, data for textual or graphical annotations to be displayed that correspond to at least some of the items in the obtained image, the data being formatted for display with the obtained image or a subsequently captured image;
identifying data that is indicative of interactions by a user of the computing device with the displayed textual or graphical annotations, and using the data that is indicative of the interactions by the user of the computing device with the displayed textual or graphical annotations to compare subsequently captured images with the plurality of geo-coded images.

3. The method of claim 1, wherein determining the calculated device position information comprises determining a direction of aim of the computing device by computing an offset between a location at which one of the geo-coded images was captured and the general device position information that indicates the geographic location at which the image was captured and that was generated using information sensed by the one or more position sensors.

4. The method of claim 1, wherein the image characterizing data comprises data encoding corner points on the items in the images.

5. The method of claim 1, wherein determining the calculated device position information comprises computing outlines of the items in the obtained image.

6. The method of claim 5, further comprising identifying spatial locations within the identified outlines as anchor points for annotations that correspond to at least some of the items in the obtained image and providing, to the computing device, data that characterizes the identified spatial locations to cause the computing device to display the annotations with the obtained image on the computing device according to the identified spatial location.

7. The method of claim 1, further comprising:
obtaining, by the computer system along with the obtained image, range data that is generated based on information from one or more range sensors of the computing device and that indicates a distance of the one or more items in the obtained image from the computing device, and
using the range data to identify the geographic locations of the items in the obtained image.

8. The method of claim 1, further comprising selecting the plurality of geo-coded images from a larger group of geo-coded images using the general device position information obtained from the computing device.

9. The method of claim 8, wherein selecting the plurality of geo-coded images comprises selecting a sub-set of images that are coded as being acquired within a determined geographic distance from the geographic location indicated by the general device position information.

10. A computer-readable device storing instructions that when executed by a computer system cause the computer system to perform operations comprising:
obtaining an image that was captured by a computing device;
identifying image characterizing data for the obtained image, the image characterizing data identifying characteristic points of one or more items in the image;
obtaining general device position information that indicates a geographic location at which the image was captured by the computing device and that was generated using information sensed by one or more position sensors of the computing device that sense geographic location information;
selecting a plurality of geo-coded images based on the general device position information;
comparing the image characterizing data for the obtained image with image characterizing data for the plurality of geo-coded images;
determining, based on a result of comparing the image characterizing data for the obtained image with the image characterizing data for the plurality of geo-coded images, calculated device position information that indicates a refined geographic location at which the image was captured by the computing device; and
providing, to the computing device, calibration data for causing the computing device to calibrate, based on the calculated device position information, the one or more position sensors of the computing device that sense geographic location information.

11. The computer-readable device of claim 10, wherein the operations further comprise:
providing, to the computing device, data for textual or graphical annotations to be displayed that correspond to at least some of the items in the obtained image, the data being formatted for display with the obtained image or a subsequently captured image;
identifying data that is indicative of interactions by a user of the computing device with the displayed textual or graphical annotations, and
using the data that is indicative of the interactions by the user of the computing device with the displayed textual or graphical annotations to compare subsequently captured images with the plurality of geo-coded images.

12. The computer-readable device of claim 10, wherein determining the calculated device position information comprises determining a direction of aim of the computing device by computing an offset between a location at which one of the geo-coded images was captured and the general device position information that indicates the geographic location at which the image was captured and that was generated using information sensed by the one or more position sensors.

13. The computer-readable device of claim 10, wherein the image characterizing data comprises data encoding corner points on the items in the images.

14. The computer-readable device of claim 10, wherein determining the calculated device position information comprises computing outlines of the items in the obtained image.

15. The computer-readable device of claim 14, wherein the operations further comprise identifying spatial locations within the identified outlines as anchor points for annotations that correspond to at least some of the items in the obtained image and providing, to the computing device, data that characterizes the identified spatial locations to cause the computing device to display the annotations with the obtained image on the computing device according to the identified spatial location.

16. The computer-readable device of claim 10, wherein the operations further comprise:
obtaining, along with the obtained image, range data that is generated based on information from one or more range sensors of the computing device and that indicates a distance of the one or more items in the obtained image from the computing device, and
using the range data to identify the geographic locations of the items in the obtained image.

17. The computer-readable device of claim 10, wherein the operations further comprise selecting the plurality of geo-coded images from a larger group of geo-coded images using the general device position information obtained from the computing device.

18. The computer-readable device of claim 17, wherein selecting the plurality of geo-coded images comprises selecting a sub-set of images that are coded as being acquired within a determined geographic distance from the geographic location indicated by the general device position information.

19. A computer system, comprising:

one or more processors, a computer-readable medium storing instructions that when executed by the one or more processors cause the computing system to perform operations comprising:

obtaining an image that was captured by a computing device;

identifying image characterizing data for the obtained image, the image characterizing data identifying characteristic points of one or more items in the image;

obtaining general device position information that indicates a geographic location at which the image was captured by the computing device and that was generated using information sensed by one or more position sensors of the computing device that sense geographic location information;

selecting a plurality of geo-coded images based on the general device position information;

comparing the image characterizing data for the obtained image with image characterizing data for the plurality of geo-coded images;

determining, based on a result of comparing the image characterizing data for the obtained image with the image characterizing data for the plurality of geo-coded images, calculated device position information that indicates a refined geographic location at which the image was captured by the computing device; and providing, to the computing device, calibration data for causing the computing device to calibrate, based on the calculated device position information, the one or more position sensors of the computing device that sense geographic location information.

20. The computer system of claim 19, wherein the operations further comprise:

providing, to the computing device, data for textual or graphical annotations to be displayed that correspond to at least some of the items in the obtained image, the data being formatted for display with the obtained image or a subsequently captured image;

identifying data that is indicative of interactions by a user of the computing device with the displayed textual or graphical annotations, and using the data that is indicative of the interactions by the user of the computing device with the displayed textual or graphical annotations to compare subsequently captured images with the plurality of geo-coded images.

21. The computer system of claim 19, wherein determining the calculated device position information comprises determining a direction of aim of the computing device by computing an offset between a location at which one of the geo-coded images was captured and the general device position information that indicates the geographic location at which the image was captured and that was generated using information sensed by the one or more position sensors.

22. The computer system of claim 19, wherein the image characterizing data comprises data encoding corner points on the items in the images.

23. The computer system of claim 19, wherein determining the calculated device position information comprises computing outlines of the items in the obtained image.

24. The computer system of claim 23, wherein the operations further comprise identifying spatial locations within the identified outlines as anchor points for annotations that correspond to at least some of the items in the obtained image and providing, to the computing device, data that characterizes the identified spatial locations to cause the computing device to display the annotations with the obtained image on the computing device according to the identified spatial location.

25. The computer system of claim 19, wherein the operations further comprise:

obtaining, along with the obtained image, range data that is generated based on information from one or more range sensors of the computing device and that indicates a distance of the one or more items in the obtained image from the computing device, and using the range data to identify the geographic locations of the items in the obtained image.

26. The computer system of claim 19, wherein the operations further comprise selecting the plurality of geo-coded images from a larger group of geo-coded images using the general device position information obtained from the computing device.

27. The computer system of claim 26, wherein selecting the plurality of geo-coded images comprises selecting a sub-set of images that are coded as being acquired within a determined geographic distance from the geographic location indicated by the general device position information.

\* \* \* \* \*